(12) United States Patent
Oishi

(10) Patent No.: US 6,512,724 B1
(45) Date of Patent: Jan. 28, 2003

(54) OPTICAL RECORDING AND REPRODUCING APPARATUS

(75) Inventor: Masami Oishi, Saitama (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/333,939

(22) Filed: Jun. 16, 1999

(30) Foreign Application Priority Data

Jun. 16, 1998 (JP) .......................... 10-185579

(51) Int. Cl.[7] ................................. G11B 7/00
(52) U.S. Cl. ................... 369/53.35; 369/53.24
(58) Field of Search .................... 369/47.33, 53.24, 369/32, 44.23, 47.54, 47.11, 47.12, 53.31, 47.44, 30.21, 53.35, 44.32, 53.15, 53.17, 47.14

(56) References Cited

U.S. PATENT DOCUMENTS 5,559,778 A * 9/1996 Inokuchi et al. ......... 369/53.24
5,815,472 A * 9/1998 Kuroda et al. ........... 369/47.33
6,195,321 B1 * 2/2001 Takamine et al. ........ 369/47.44

* cited by examiner

Primary Examiner—W. R. Young
Assistant Examiner—Kim-Kwok Chu
(74) Attorney, Agent, or Firm—Sughrue Mion, PLLC

(57) ABSTRACT

An optical recording and reproducing apparatus includes: a pickup for obtaining an information signal from reflected light when light is irradiated to and reflected on a successively writing type optical recording medium; an RF signal detector for obtaining an RF signal from a reflected light signal supplied from the pickup; a final recording unit extractor for extracting a final recording unit from RF signal, the final recording unit being contained in RF signal; a timer for measuring a period of time from a head of a data block right after the final recording unit to a point of time at which RF signal is not detected; a last time final recording position specifying section for specifying a last time final recording position; and a recording error judgment section for judging whether or not a recording error occurred last time.

6 Claims, 5 Drawing Sheets

OPTICAL RECORDING AND REPRODUCING APPARATUS

BACKGROUND OF THE INVENTION

1. Field of the Invention

The present invention belongs to a field of an optical recording and reproducing apparatus in which recording can be successively continued right after a previously recorded portion when recording is conducted on an optical recording medium.

2. Description of the Related Art

A write-once type optical recording medium is defined as an optical recording medium in which recording can be conducted only once in one area of an optical recording medium on which recording has not been conducted yet. As one of the write-once type optical recording medium, there is provided a successively writing type optical recording medium in which one piece of information is recorded in one area of the optical recording medium at present and then another piece of information can be recorded in another area which is located successively to the above area in which one information has been previously recorded.

Conventionally, as the successively writing type optical recording medium, there is provided a CD-R which is an abbreviation of CD-Recordable. FIGS. 4A to 4C are views showing a recording format (packet) of CD-R. As shown in FIG. 4A, CD-R includes: a first link block for linking a record with a final portion of the previous data; a run-in area in which only data expressing a start position of recording is recorded in 4 sectors; a user data area; a run-out area in which only data expressing an end position of recording is recorded in 2 sectors; and a second link block expressing the next writing position.

In the case where recording is conducted on an optical recording medium having the above structure, when an electric power failure has occurred in the process of recording a piece of information or when an operator mistakenly has turned off an electric power source, recording can not be properly conducted and further recording is stopped. In this case, since the recording and reproducing apparatus is stopped before the completion of normal recording, a recording signal is suddenly stopped in the middle of recording information.

In the above case, since recording is not properly completed, the run-out area and the second link block, which should be written in the case of normal recording, are not written on the optical recording medium. When the second link block is not written on the optical recording medium, it is impossible to determine a starting position of the next time recording, and further there is a possibility that data has been broken in an end block at the previous recording position. For the above reasons, it is impossible to continue to record the following data right after the recording end position of the last time on the optical recording medium.

In the above case, when the next recording is conducted after an error position of the optical recording medium in the optical recording and reproducing apparatus, it is necessary to recover the error before conducting the next time recording and make a link block so that the next time recording can be properly conducted.

In the case of the arrangement of packets of CD-R, when an error occurs in the middle of recording information, the final packet is ended without being composed of the run-out area and the second link block as shown in FIG. 4B. Accordingly, it is possible to judge the occurrence of an error when the run-out area or the second link block is not detected.

When the run-out area or the second link block is not detected, it is judged that a recording error has occurred. Then, a run-in area of the final packet, in which the recording error has occurred on the optical recording medium, is detected in the optical recording and reproducing apparatus.

Next, a period of time from the detected run-in area to a point of time at which RF signal is not detected, or a period of time from a head portion of user data, which follows the detected run-in area, to a point of time at which RF signal is not detected is measured, and a position of data to be repaired is specified by the thus measured time information.

Next, as shown in FIG. 4C, dummy data is written at positions where RF signal is lost and also at hatched positions, and dummy user data, run-out area and link block are recorded, so that data can be repaired. Data can be successively written after the repaired data in the same manner as that of normal operation.

At present, instead of CD-R, an optical recording medium such as DVD-R, which is a successively writing type optical recording medium, is proposed. FIGS. 5A to 5C are views showing an arrangement of recording packets of DVD-R. As shown in FIG. 5A, in the case of DVD-R, a unit of recording is a type of ECC (error correction code) block. A reading unit is also a type of ECC block. In the case of DVD-R, a link flag is put up together with user data in the final sector of final ECC of recorded user data. An overwriting area is provided in the first sector of the next ECC block. When the successively writing operation is conducted, the writing of the next time is linked with the overwriting area.

In the case of DVD-R, an ECC block is used as a unit when signals are read. Therefore, an incomplete ECC block is not recognized as data. Unlike a run-in and a run-out area of CD-R, DVD-R has no sectors in which only a signal of start of recording or a signal of end of recording is written.

Accordingly, in the case of DVD-R, it is impossible to use an error detection method, which is used in the case of CD-R, in which only an area having a special signal such as a run-out signal or a link block is extracted. Therefore, in the case of DVD-R, whether or not the recording is ended is judged by the existence of a link flag in the final sector of ECC block, which has been finally recorded, in ECC blocks which can be detected and perfectly recorded. In the case where the link flag is not put up in the final sector of the final ECC block which can be detected at that time, it is possible to judge that an error of recording has occurred in the next ECC block.

However, according to the above method, the following problems may be encountered. For example, even if a link flag is written in the final sector of the final ECC block which can be detected, when recording is stopped for some reasons before one ECC block is recorded after recording has been started on the ECC block right after that, it is judged that recording is conducted properly because the link flag is put up in the final sector of the final ECC bloc which can be detected. Therefore, with respect to the ECC block arranged right after that, it is impossible to know that an error of recording has occurred.

Accordingly, when the successively writing operation is conducted, there is a possibility that the next recording data is overwritten on the ECC block in which the error has been caused. In this case, it is impossible to conduct overwriting in the same area in the successively writing type optical recording medium. Therefore, the successively writing data is also damaged.

SUMMARY OF THE INVENTION

The present invention has been accomplished to solve the above problems. It is an object of the present invention to provide an optical recording and reproducing apparatus in which a successively writing position can be specified quickly and accurately when successive writing is conducted on an optical recording medium composed of only a link block and user data. More particularly, it is an object of the present invention to provide an optical recording and reproducing apparatus in which the final recording position can be specified quickly and accurately in order to recover an error of recording when the error has occurred in the middle of recording in the last time.

According to a first aspect of the present invention, there is provided an optical recording and reproducing apparatus comprising: a pickup for obtaining an information signal from reflected light when light is irradiated to and reflected on an optical recording medium; an RF signal detection means for obtaining an RF signal from a reflected light signal supplied from the pickup; a final recording unit extraction means for extracting a final recording unit, which has been properly recorded, from RF signal, the final recording unit being contained in RF signal; a timer means for measuring a period of time from a head of a data block right after the final recording unit to a point of time at which RF signal is not detected; a last time final recording position specifying means for specifying a last time final recording position; and a recording error judgment means for judging whether or not a recording error occurred last time.

Therefore, even if data, which has been written in a successively writing type optical recording medium, causes a writing error in a data block next to a data block in which the final link flag has been detected, it is possible to positively detect the writing error.

According to a second aspect of the invention, there is provided an optical recording and reproducing apparatus according to the first aspect of the invention, wherein the error judgment means comprising: a recording end information detection means for detecting recording end information existing at a predetermined position in the final recording unit; and a time information judgment means for judging whether or not a value of time information obtained by the timer means is a predetermined value according to the recording end information.

Accordingly, even if information of end of recording is recorded in the final recording unit, it is possible to check a recording error in the next recording unit. Therefore, the successively writing operation can be safely conducted.

According to a third aspect of the invention, there is provided an optical recording and reproducing apparatus according to the first aspect of the invention, further comprising a pseudo data generation means for recording pseudo data for recovering an error in a recording unit including a final recording position and also including a recording unit right after that when a recording error signal is received from the error judgment means.

Accordingly, it is possible to smoothly recover a recording error at a position where the recording error has occurred.

According to a fourth aspect of the invention, there is provided an optical recording and reproducing apparatus according to the first aspect of the invention, wherein the timer means is a pulse signal counter synchronized with a writing block contained in data to be written in.

Accordingly, it is possible to accurately recognize the successively writing position without using a large-scale complicated timer unit.

DETAILED DESCRIPTION OF THE PREFERRED EMBODIMENTS

Referring to the appended drawings, a preferred embodiment of the present invention will be explained as follows.

Figure 1:
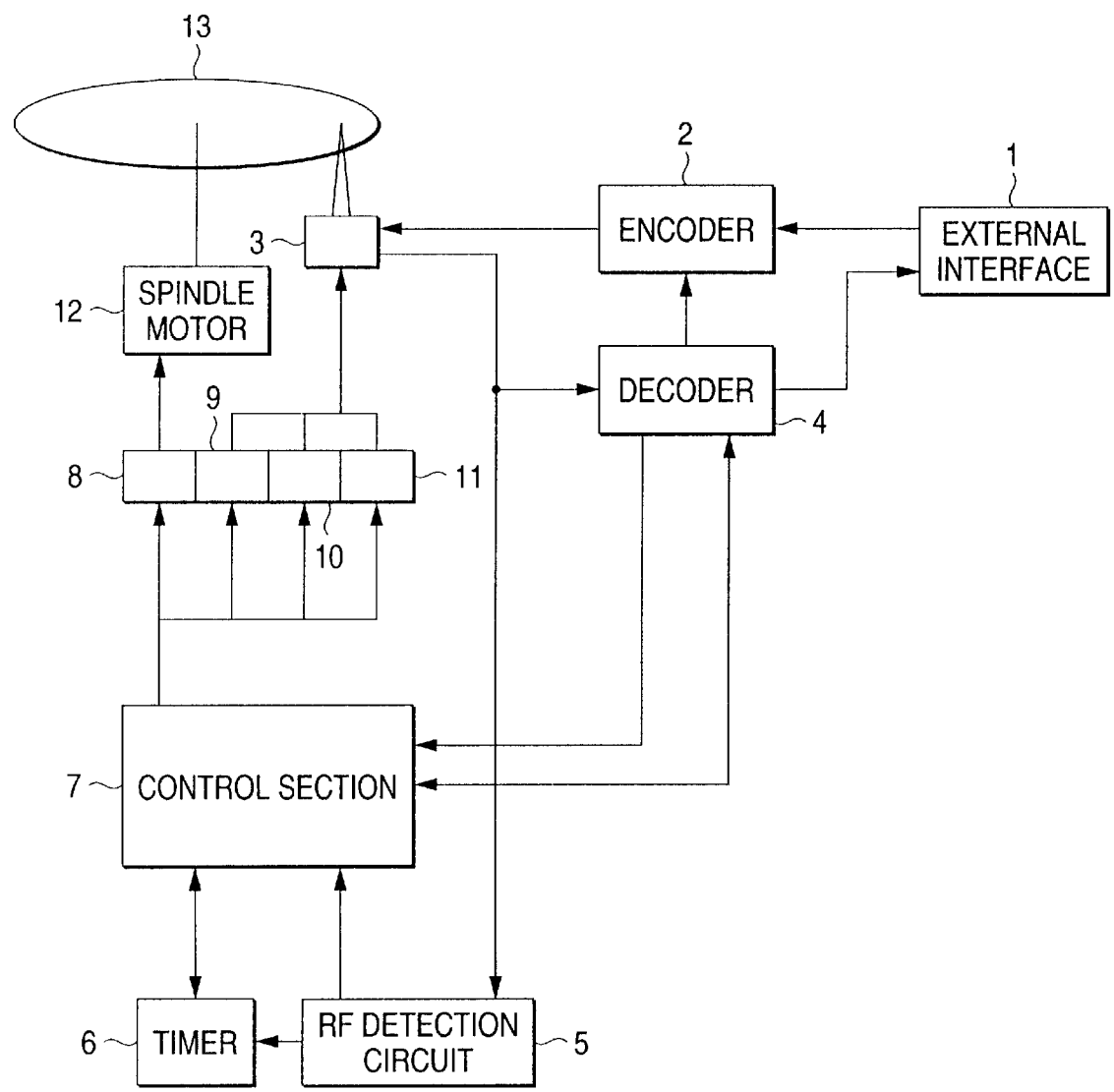
FIG. 1 is a block diagram showing an outline of the structure of the optical recording and reproducing apparatus of the embodiment of the present invention.

As shown in FIG. 1, an optical recording and reproducing apparatus of the embodiment of the present invention includes: an external interface 1, encoder 2, pickup 3, decoder 4, RF detection circuit 5, timer 6, control section 7, spindle control section 8, tracking control section 9, slider control section 10, focus control section 11, and spindle motor 12. An optical recording medium 13 is an optical recording medium capable of reproducing information recorded on a common optical recording medium which is not a successively writing type optical recording medium.

Next, operation of the apparatus of the above arrangement will be explained below.

When information is recorded on the optical recording medium 13, first, the spindle motor 12 is rotated at a certain speed. As a result, the optical recording medium 13, which has been set above the spindle motor, is also rotated in accordance with the rotation of the spindle motor 12.

Next, the optical recording medium 13 is irradiated with laser beams emitted from the pickup 3. A portion of the laser beams, which have been irradiated to the optical recording medium 13, are reflected and returned to the pickup 3 as reflected light. This reflected light is received by the pickup 3.

On the optical recording medium 13, pre-grooves and pre-pits are previously recorded which are used for specifying recording positions necessary for successive writing and reproducing. Reflected light which has been reflected on the optical recording medium 13 contains signals recorded in the pre-grooves and pre-pits. When the optical recording medium 13 is rotating at a certain speed, it is possible to extract these signals.

Reflected light is converted into a reflected light signal by the pickup 3 and outputted to RF detection circuit 5.

In RF detection circuit 5, an RF signal is extracted from the reflected light signal inputted from the pickup 3. The thus extracted RF signal is inputted into the control section 7 and the timer 6 from RF detection circuit 5.

In the control section 7, first, a pre-pit signal is extracted from the inputted RF signal. The thus extracted pre-pit signal is decoded, so that a positional information of the optical beam on the optical recording medium 13 can be found. According to the positional information which has been found in this way, a rotational speed of the spindle motor 12 and a quantity of control of the position of the pickup 3 are determined.

According to the thus determined quantity of control, the control section 7 generates a control signal of the spindle 12 and also generates control signals of tracking, slider and focusing of the pickup. The respective control signals are outputted to a spindle control circuit 8, tracking control circuit 9, slider control circuit 10 and focus control circuit 11.

The respective control circuits control a rotational speed of the spindle motor 12 and a position of the pickup 3 according to the control signal sent from the control circuit 7.

When the pickup 3 arrives at a successively writing position on the optical recording medium 13, it is put into a posing condition. In this way, the preparation of recording is completed. In this connection, a specific method by which the optical recording medium 13 arrives at the successively writing position will be described later.

Next, steps of recording user data will be explained below.

User data to be recorded is inputted from the outside of the optical recording and reproducing apparatus into the encoder 2 via the external interface 1 as a user data signal.

In the encoder 2, user data obtained from the user data signal inputted from the external interface 1 is temporarily accumulated in a recording data buffer not shown.

When a recording command is received from the control section 7, the accumulated data is converted into data signals to be recorded. Therefore, first, the user data signal is divided into data of 2048 bites. With respect to the divided data, ID information showing a starting position of the data sector is generated, and also data, to which an ID information error correction code for correcting an error of the ID information concerned is added, is generated.

Next, preparatory data is added to the generated data, and also an error detection code for detecting an error of the divided data of 2048 bites is added to the generated data. In this way, one data sector is formed. When a plurality of data sectors are continued, data to be recorded can be composed.

When the data sectors are formed, scramble modulation is conducted on a portion of data with predetermined key data. Key data used for scramble modulation is recorded together with user data.

Next, an ECC block, which is a unit of correction in the error correction conducted in the case of reproducing data, is generated with the data sector contained in the data signal. One ECC block contains 16 data sectors.

The generated ECC blocks are respectively subjected to interleave and 8–16 modulation and outputted to the pickup 3 so that they can be used as recording data signals to be recorded on the optical recording medium 13.

The pickup 3 conducts an intensity modulation of laser beams by recording data signals outputted from the encoder, 2. Laser beams, the intensities of which have been modulated, are concentrated on a recording layer of the optical recording medium 13. A reflection factor of the recording layer of the optical recording medium 13 onto which laser beams are condensed is changed. A portion of the recording layer of the optical recording medium 13, the reflection factor of which has been changed, functions as a recorded pit.

Next, reproducing operation of the optical recording medium 13 will be explained below.

When the optical recording medium 13 is reproduced, beams of light which are emergent from the pickup 3 are condensed onto the recording layer of the optical recording medium 13 rotated by the spindle motor 12. Then the beams of light are reflected on the reflecting layer of the optical recording medium 13 and returned to and received by the pickup 3.

The reflected light, which has been received in this way, is converted into a reflecting light signal by the pickup 3 and outputted. The reflecting light signal outputted from the pickup 3 is inputted into RF detection circuit 5 and the decoder 4. In the same manner as that of recording, RF detection circuit 5 detects an RF signal from the inputted reflecting signal and controls the spindle motor 12 and the pickup 3 by the control signal which is outputted from the control section 7 after the signal is inputted into the timer 6.

On the other hand, the decoder 4 conducts deinterleave on the reflecting signal inputted from the pickup 3. Also the decoder 4 conducts 8–16 demodulation and error correction, so that an output data signal is generated.

The thus generated output data signal is temporarily stored in a reading data buffer not shown until a command of outputting an output data signal to the external interface 1 is received.

According to an output signal inputted from the control section 7, the output data signal is transmitted from the decoder 4 to the external interface 1 and outputted to an external apparatus from the external interface 1.

Next, operation of successively writing data at a position where data was previously recorded will be described in detail.

Figure 2:
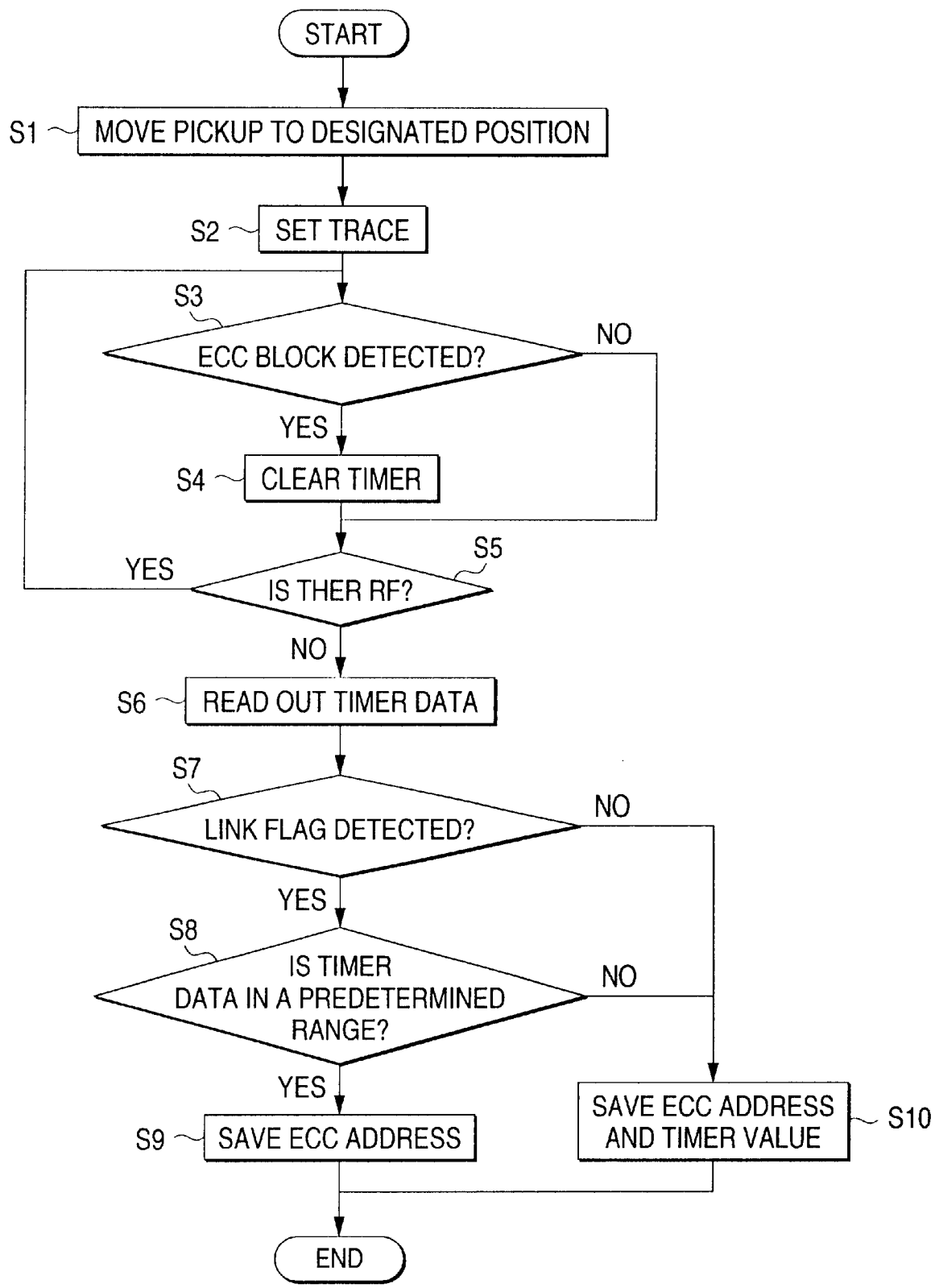
FIG. 2 is a flow chart for detecting a final recording position of the recording medium of the optical recording and reproducing apparatus of the embodiment of the present invention.

FIG. 2 is a flow chart for detecting the final recording position of the recording of the last time by the control section 7, wherein detecting the final recording position of the previous recording is necessary when data is successively written in the optical recording medium 13. Also, FIG. 2 is a flow chart for judging whether or not an error occurred in the recording of the last time.

In the optical recording and reproducing apparatus of the embodiment, first, in order to detect the final recording position on the optical recording medium 13, the control section 7 determines the RF final position, at which RF is interrupted, by RF detecting function.

In order to determine the RF final position, first, the pickup 3 is moved to the final sector of the final ECC block (step S1), and then tracing is started there. At the same time, the timer 6 is started (step S2). The program waits that ECC block sink signal, which is extracted from the pre-pits of the optical recording medium 13 and shows a start of the ECC block, is inputted into the control section 7 and the timer 6 from RF detection means 5 (step S3).

At the point of time when ECC block sink signal is inputted, a value of the timer is cleared (step S4). Right after that, the timer starts counting. ECC block address, which can be known by ECC block sink signal, is stored in a memory not shown by the control section 7.

At the point of time when RF signal is not detected by RF detection means 5 and the signal outputted from RF detection means 5 is interrupted (step S5), the timer 6 is stopped and a value of the timer 6 is held (step S6). After all, it is possible to know a period of time from a point of time when ECC block sink is finally inputted, to a point of time when RF signal is not detected. An end position of the recording of the last time is determined by the address of ECC block sink which has been stored in the memory in the control section 7 and also by the value of the timer 6 at the point of time when RF signal has been interrupted.

In order to judge whether or not an error of recording occurred at the position where the recording of the last time was ended, the following steps are carried out.

First, the pickup 3 is returned to a completely recorded ECC block (final ECC block), which can be detected and is located immediately before RF final position, and a link flag in the final sector of the final ECC block is checked (step S7). In this case, when the link flag is not put up, that is, when the link flag signal is 0 in the final sector although it is the final ECC block, it can be judged that recording from RF final position to ECC block was not properly ended.

When the link flag of the final ECC block is put up, that is, when the link flag signal is 1, it can be judged that the recording was properly ended for the present. However, at this stage, concerning ECC block including RF final position, it is impossible to judge whether or not the recording was properly ended.

When the link flag is put up in the final sector of final ECC block, a value of the timer 6 is checked (step S8). When the value of the timer 6 does not exceed a range designated as an overwriting area, it can be judged for the first time that the recording was properly ended in ECC block including RF final position, wherein the range designated as an overwriting area is usually set to be one sector.

However, when the value of the timer 6 exceeds the range designated as an overwriting area, it expresses that RF recording was not ended at the link position. Therefore, it is judged to be an error block of recording in ECC block including RF final position.

When it is judged by these steps that the recording was properly ended, the final recording position is determined from a finally obtained value of ECC block address (step S9), and the usual successive recording is started at this point.

When it is judged in step 7 or 8 that an error of recording occurred, the final recording position is specified by the finally obtained ECC block address stored in the memory and also by the value of the timer 6 (step S10), and the error is recovered at the final position.

Next, a flow of recovering the error will be explained below.

When it is judged that an error occurred, first, ECC block in which the error occurred is searched.

Next, a position to start writing in ECC block is calculated by the value of the timer 6, and the pickup 3 is moved to a calculated position to start writing on the successively writing type recording medium 13.

Next, the error is recovered in such a manner that dummy data for recovering the error is written in all the sectors, on which writing has not been conducted yet, of ECC block in which the error of recording occurred.

Successively after that, dummy data is written in only one ECC block. An object of writing dummy data in one extra ECC block is to prevent ECC block, in which the error of recording occurred, from having a bad influence on the normal data after that when data is read out.

When writing is ended in ECC block for successively writing, recovery of data is ended. A link flag is put up in the final sector of ECC block for successively writing. Therefore, it becomes possible to write normal data after the completion of recovery of data.

In this connection, concerning the time at which data used for successive writing is recovered, when data is recovered immediately before recording after a command of next recording has been received, because an operator recognizes that recording is being conducted now, it is possible to prevent the operator from turning off an electric power source in the middle of recovering the error. Therefore, it is advantageous that data is recovered immediately before recording. However, it is possible to know that the previous recording position is an error, by checking a recording medium when it is inserted. Therefore, it is possible to recover the error automatically at the time.

Next, the timer 6 used in this embodiment will be explained below.

Figure 3:
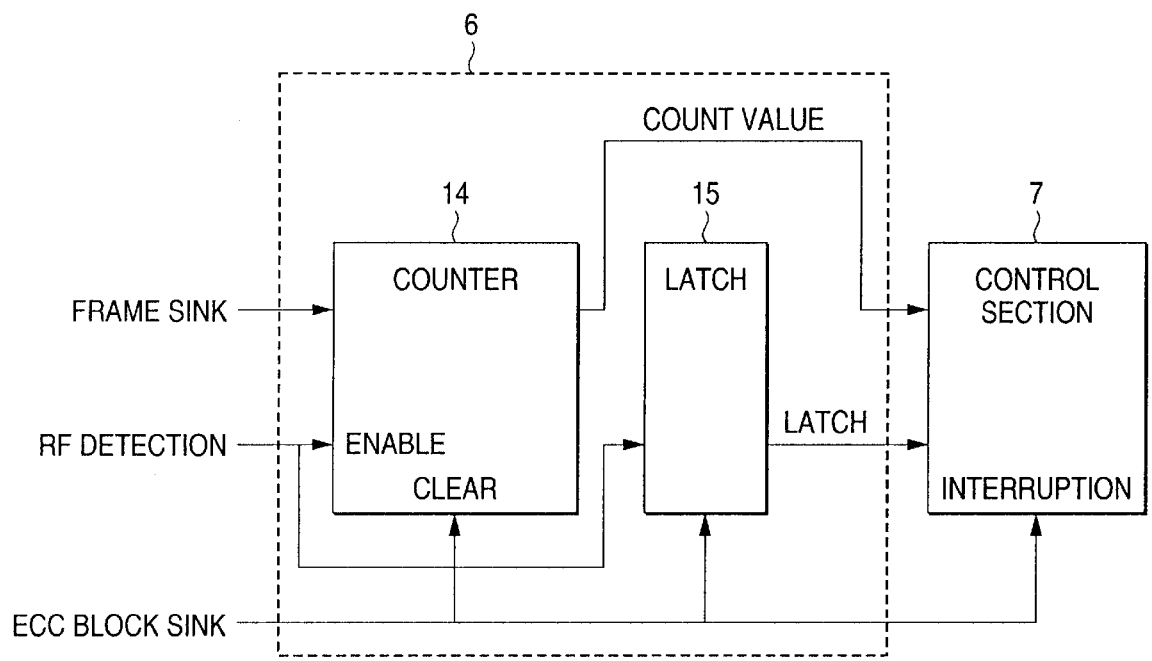
FIG. 3 is a block diagram showing an outline of the inside structure of the timer of the embodiment of the present invention.
Figure 4A:
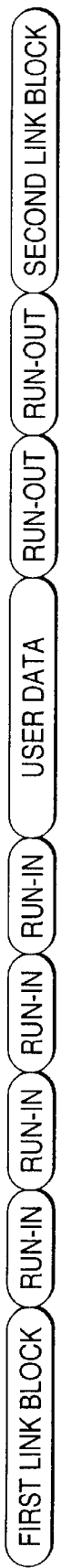
FIGS. 4A to 4C are views of recording packets of CD-R.
Figure 4B:
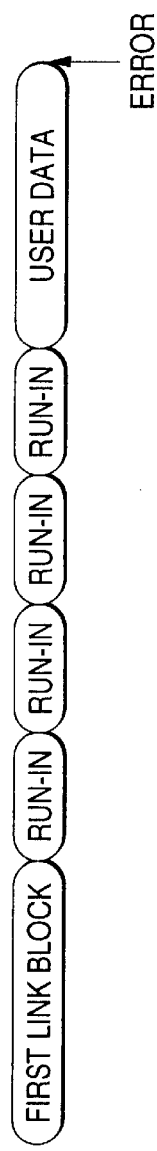
Figure 4C:
Figure 5A:
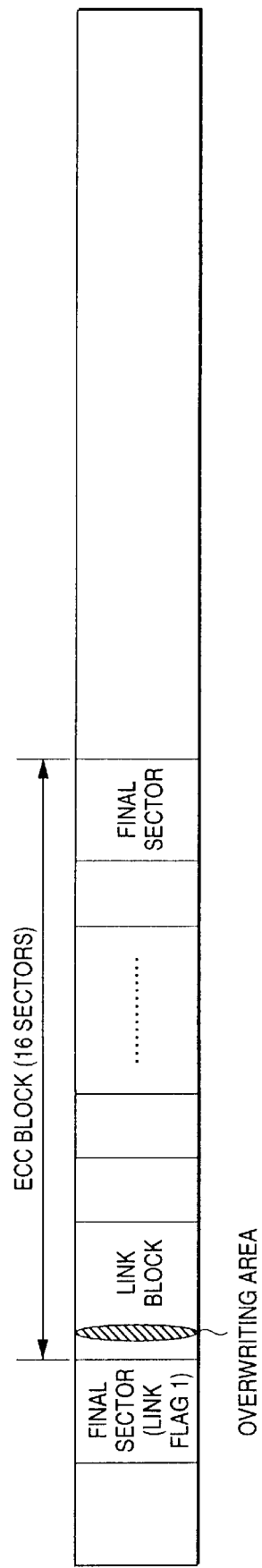
FIGS. 5A to 5C are views of recording packets of DVD-R.
Figure 5B:
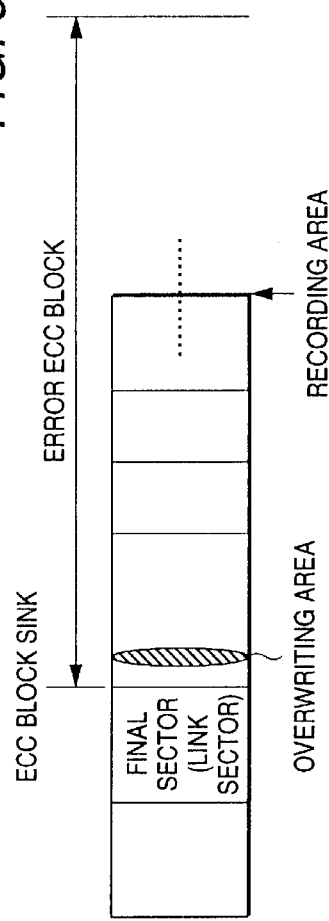
Figure 5C:
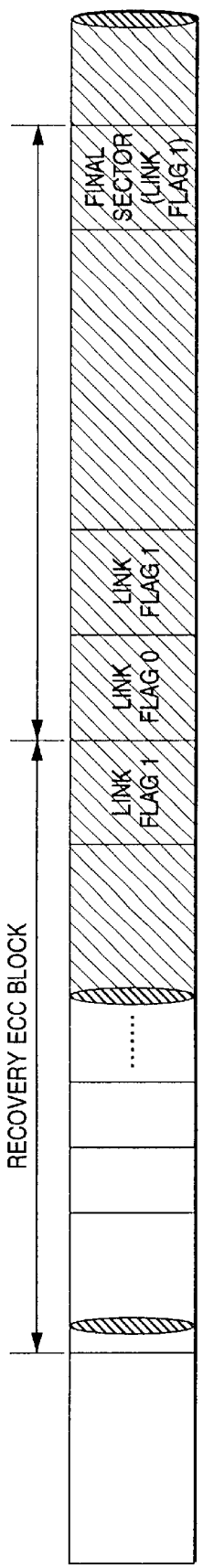

FIG. 3 is a view showing an inner structure of the timer 6 used in this embodiment.

As shown in FIG. 3, the timer 6 includes: a counter 14 for counting signal pulses; and a latch 15 which is latched by ECC block sink pulses.

On the optical recording medium 13, address information and pre-pits, which are signals necessary for accurate reproduction of clock used for recording and reproducing, are previously recorded. RF signal obtained from reflected light sent from the optical recording medium 13 is decoded by the control section 7, and ECC block sink and frame sink are extracted. Frame sink is 26 pulses per one sector, and 16 sectors exist in one ECC block. Therefore, 416 pulses are generated as frame sinks per one ECC block.

The extracted frame sinks are inputted into the counter 14. In the counter 14, the number of the inputted frame sinks is counted. A value of the counter is reset when ECC block sink expressing a head of ECC block is inputted. RF detection signal sent from RF detection means is also inputted into the counter 14. When the input of RF signal is not obtained, the counter 14 is stopped by a signal sent from RF detection means, and the value is held in the counter.

ECC block sink is also inputted into the latch 15. The latch 15 corresponds to a memory for storing the address of ECC block not shown in the control section 7. A value of the latch 15 is latched when the block sink is inputted. When RF detection is not made by RF detection means, the latch is stopped, and the value is held. A position of ECC block at which RF is not obtained can be specified by the value of the latch.

The values of the counter 14 and the latch 15, which are held, are respectively inputted into the control section 7. The control section 7 specifies the next writing position by the values of the counter 14 and the latch 15 which have been inputted into the control section 7. The control section judges whether writing has been properly ended at the position or writing has been ended when an error has occurred in the writing.

In this embodiment, the signal of the frame sink extracted from RF signal is used as a signal to be inputted into the counter 14. However, as a signal to be inputted into the counter 14, it is possible to use a signal obtained when a reference clock for controlling the spindle, which is synchronized with a clock in data, is appropriately divided.

As described above, according to a first aspect of the invention, there is provided an optical recording and reproducing apparatus comprising: a pickup for obtaining an information signal from reflected light when light is irradiated to and reflected on a successively writing type optical recording medium; an RF signal detection means for obtaining an RF signal from a reflected light signal supplied from the pickup; a final recording unit extraction means for extracting a final recording unit, which has been properly recorded, from RF signal, the final recording unit being contained in RF signal; a timer means for measuring a period of time from a head of a data block right after the final recording unit to a point of time at which RF signal is not detected; a last time final recording position specifying means for specifying a last time final recording position; and a recording error judgment means for judging whether or not a recording error occurred last time. Therefore, it is possible to specify the next writing position accurately and judge an error caused in the previous recording.

According to a second aspect of the invention, there is provided an optical recording and reproducing apparatus in which the error judgment means comprises: a recording end information detection means for detecting recording end information existing at a predetermined position in the final recording unit; and a time information judgment means for judging whether or not a value of time information obtained by the timer means is a predetermined value according to the recording end information. Accordingly, it is possible to judge an error of recording accurately.

According to a third aspect of the invention, there is provided an optical recording and reproducing apparatus which comprises a pseudo data generation means for recording pseudo data for recovering an error in a recording unit including a final recording position and also including a recording unit right after that when a recording error signal is received from the error judgment means. Accordingly, it is possible to recover an error of recording smoothly at a position where the error of recording occurred.

According to a third aspect of the invention, the timer means for measuring a period of time from the final link block to a point of time at which RF signal is not detected is directly generated from time information previously recorded in the recording medium. Accordingly, the timer means is small-scale, and accurate positional information can be obtained.

What is claimed is:

1. An optical recording and reproducing apparatus comprising:

a pickup for obtaining an information signal from reflected light when light is irradiated to and reflected on an optical recording medium;

an RF signal detector for obtaining an RF signal from a reflected light signal supplied from said pickup;

a final recording unit extractor for extracting a final recording unit, which has been properly recorded, from RF signal, said final recording unit being contained in RF signal;

a timer for measuring a period of time from a head of a data block right after said final recording unit to a point of time at which RF signal is not detected;

a last time final recording position specifying section for specifying a last time final recording position; and a recording error judgment section for judging whether or not a recording error occurred last time.

2. An optical recording and reproducing apparatus according to claim 1, wherein said error judgment section comprises: a recording end information detector for detecting recording end information existing at a predetermined position in the final recording unit; and a time information judgment section for judging whether or not a value of time information obtained by said timer is a predetermined value according to the recording end information.

3. An optical recording and reproducing apparatus according to claim 1, further comprising a pseudo data generator for recording pseudo data for recovering an error in a first recording unit including a final recording position and a second recording unit right after the first recording unit when a recording error signal is received from the error judgment section.

4. An optical recording and reproducing apparatus according to claim 1, wherein said timer comprises a pulse signal counter that generates pulse signals in synchronism with a writing block contained in data to be written.

5. An optical recording and reproducing apparatus, comprising:

a pickup that generates an information signal from reflected light when light is irradiated to and reflected off of an optical recording medium;

an RF signal detector that generates an RF signal based on said information signal supplied from said pickup;

a control circuit that extracts a data recording unit from the RF signal, wherein the data recording unit has been previously and properly recorded on said optical recording medium; and a timer circuit that measures a period of time from a head of a data block succeeding said data recording unit, which was extracted by said control circuit, to a point of time at which said RF signal is no longer detected, wherein said control circuit determines a final recording position after said head of said data block and determines whether or not a recording error occurred after said head of said data block was recorded.

6. The apparatus as claimed in claim 5, wherein said control circuit determines whether or not said recording error occurred at least partially based on said period of time measured by said timer circuit.

* * * * *